(12) United States Patent
Piaget

(10) Patent No.: US 7,975,655 B2
(45) Date of Patent: Jul. 12, 2011

(54) DOG TRAINING AND EXERCISE APPARATUS

(76) Inventor: Gary D. Piaget, Deer Harbor, WA (US)

(*) Notice: Subject to any disclaimer, the term of this patent is extended or adjusted under 35 U.S.C. 154(b) by 653 days.

(21) Appl. No.: 11/381,568

(22) Filed: May 4, 2006

(65) Prior Publication Data

US 2007/0277746 A1 Dec. 6, 2007

(51) Int. Cl.
*A01K 29/00* (2006.01)
(52) U.S. Cl. ..................... 119/707; 119/51.01
(58) Field of Classification Search ............... 119/51.01, 119/719, 707–711; 401/63, 82, 150, 176, 401/181, 182
See application file for complete search history.

(56) References Cited

U.S. PATENT DOCUMENTS

| | | | | |
|---|---|---|---|---|
| 2,670,958 A * | 3/1954 | Leiser et al. | | 473/513 |
| 2,835,494 A * | 5/1958 | Hull | | 473/511 |
| 4,045,026 A * | 8/1977 | Gillespie et al. | | 473/465 |
| 4,267,799 A * | 5/1981 | Bacon | | 119/61.2 |
| 4,995,374 A * | 2/1991 | Black | | 124/54 |
| 5,174,580 A * | 12/1992 | Pratt | | 473/513 |
| 5,290,039 A * | 3/1994 | Cornelio | | 473/513 |
| 5,292,134 A * | 3/1994 | Schlundt et al. | | 473/511 |
| 6,076,829 A * | 6/2000 | Oblack | | 273/317 |
| 6,626,774 B2 * | 9/2003 | Sorbie | | 473/524 |
| 6,722,317 B2 * | 4/2004 | O'Rourke | | 119/707 |
| 6,889,869 B2 * | 5/2005 | Hallin | | 221/223 |
| 6,953,007 B1 * | 10/2005 | Cummings | | 119/712 |
| 2004/0029656 A1 * | 2/2004 | Vannoy | | 473/505 |
| 2005/0183674 A1 * | 8/2005 | Zutis et al. | | 119/719 |

* cited by examiner

*Primary Examiner* — Joshua J Michener
(74) *Attorney, Agent, or Firm* — Barlow, Josephs & Holmes, Ltd.

(57) ABSTRACT

A device for use in connection with training a dog to retrieve a ball that allows the user to repeatedly launch the ball with a reduced amount of effort while also eliminating the need for the user to physically touch the ball. The device includes a ball receiving portion and a handle that extends outwardly therefrom. The handle includes an integrated treat storage compartment and a dispenser configured to deposit treats onto the ball receiving portion. The user launches the ball and then dispenses a treat onto the ball receiving portion so that upon returning with the ball, the dog can deposit the ball onto the ball receiving portion in exchange for the treat.

8 Claims, 3 Drawing Sheets

DOG TRAINING AND EXERCISE APPARATUS

BACKGROUND OF THE INVENTION

The present invention relates generally to devices for use in connection with training and exercising dogs. More specifically, the present invention is directed to a device that is configured to dispense treats to a pet in exchange for the pet depositing a retrieved object, such as a ball. In addition, the device allows a user to launch a retrieved ball without requiring a user to physically handle the ball.

It is well known in the art that many dogs are natural retrievers and that they enjoy repeatedly retrieving or fetching objects such as sticks or balls. In addition, many dog owners enjoy the opportunity to bond and/or play with their dog that is presented through the game of fetch. One of the difficulties, however, is that in playing fetch with a dog, the stick or ball must be repeatedly thrown at relatively long distances for prolonged periods of time. As a result of the repeated throwing, often the dog owner's back and arm tire before the animal is ready to rest. Additionally, another drawback to playing the game of fetch with a dog is the need to physically pick up and throw the ball using your hands. Typically, after a few throws, the ball is covered with dog saliva and a layer of accumulated dirt and debris, which can be distasteful and unhealthy to touch. Finally, it is often difficult to persuade the dog to drop the ball once it has been retrieved. In order to get the ball back from the dog, the owner must often place their hand into the dog's mouth and extract the ball, all the while enduring the ensuing wrestling match or worse, the risk of being accidentally bitten by the dog.

To assist in throwing the ball long distances with a minimum amount of exerted effort, some individuals have resorted to using bats, tennis rackets or other catapult devices for launching the ball great distances. While such devices may be helpful in reducing the fatigue associated with repeated throwing of the ball, these devices do not address the issue of holding the ball once it has become wet and dirty nor do they assist in persuading the dog to give up the ball after retrieving it.

In general, the ability to get the dog to drop the ball after it has been retrieved relates to proper training of the dog. When training animals, such as dogs, it is beneficial for trainers to reinforce specific behaviors and acts performed by the animal by offering positive reinforcement. For positive reinforcement to be most effective, it is necessary to provide such reward in an immediate and non-distracting manner. The immediacy is necessary in that it serves to maximize the training effect because an animal's ability to associate reward with specific acts is limited to a very short period of time (approximately three (3) seconds). This ability quickly deteriorates with the passage of time and can be adversely affected by distracting movements or sounds produced by the trainer obtaining and delivering the reward.

In this regard, several known methods of providing positive reinforcement are currently employed by trainers. For example, the reward can be carried in one's hand, one's pocket, a plastic or paper bag or a bait bag. Each of these methods, however, adversely affects the act/reward association time that is so crucial to effective training. Carrying rewards in the trainer's hand is distracting for the trainer and the animal in that the animal's attention is directed at the hand holding the reward. The difficulty with carrying rewards in one's pocket or a bag is that rewarding an animal requires the trainer to dig into his pocket, unzip or open the containment device causing harmful delay in the act/reward associate time thereby causing the animal to associate his reward with a noise such as a zipper opening, or Velcro® being pulled away or the resulting sound of a plastic or paper bag. Additionally, training an animal utilizing the disposable pocket requires the trainer to consciously count the quantity of rewards retrieved from the pocket and return any unwanted rewards before rewarding the animal, again increasing the act/reward association time. The disposable pocket may also be prone to falling off during prolonged training as the adhesive may lose its grip, or be prone to being knocked off by an exuberant animal, or inclement training conditions such as brush, high grass during field exercises. Likewise, devices such as bait bag with clip may also be prone to falling off the trainer when the trainer bends down and also in many of the same instances where the disposable pocket is likely to fall off.

Accordingly, there is a need for a device that allows a user to pick up and throw a ball for a dog to fetch, while eliminating the need for the user to touch the ball with their hands. There is a further need for a device that enhances the user's ability to throw a ball for extended periods of time without tiring while also reducing or eliminating the need to physically touch the ball. There is still a further need for a device that facilitates proper training of the dog in a manner that positively reinforces the behavior of releasing the ball once it has been retrieved. There is yet a further need for a device that facilitates handling and throwing a ball repeatedly while also providing storage for dog treats and the ability to provide positive reinforcement to the dog for releasing the ball all within a convenient and easy to use package.

BRIEF SUMMARY OF THE INVENTION

In this regard, the present invention provides a novel dog training and exercise apparatus that addresses each of the drawbacks identified with the devices and methods of the prior art. In particular, the present invention is a ball-launching device, which includes a ball receiving portion that allows a user to scoop the ball from the ground after the dog has dropped it, or more preferably provides a place upon which the dog can deposit the ball after retrieval. In addition, the device includes an integrated compartment, disposed within the handle of the device, for the storage of dog treats and a dispenser that allows the treats to be dispensed one at a time onto the ball receiving portion. In this manner, treats can be made immediately available to the dog in order to facilitate positive reinforcement in the training of the dog.

In operation, the user scoops the ball from the ground using the ball receiving portion and either launches the ball, or tosses the ball and strikes it for the dog to fetch. Once the dog returns with the ball, the user dispenses a treat into the ball-receiving portion and holds the device out in front of the dog. The dog in turn must drop the ball into the ball-receiving portion in order to consume the treat. In this manner, the dog receives positive reinforcement for retrieving the ball and placing it into the ball receiving portion and the user is spared the need to handle a wet ball after wrestling it from the dog.

It is therefore an object of the present invention to provide a device for use in training a dog to properly retrieve a thrown object. It is also an object of the present invention to provide a device that allows an owner to train a dog to retrieve without having to physically handle the ball while throwing. It is still a further object of the present invention to provide a device that includes an integrated treat storage compartment and dispenser to provide immediate positive reinforcement to the dog through the reward of proper retrieving behavior. It is even still a further object of the present invention to provide a device for use in training a dog to retrieve that encourages the dog to release the ball upon return by offering a reward in exchange for the ball.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
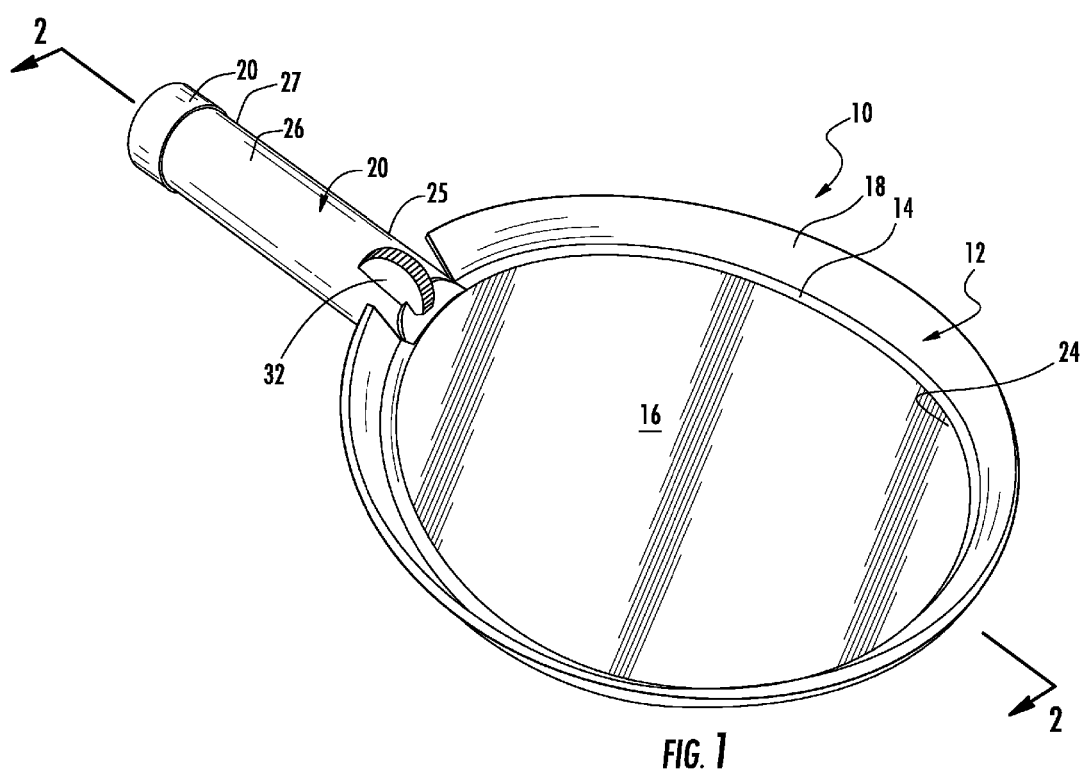
FIG. 1 is a front perspective view of a device for launching a ball in accordance with the present invention.

Now referring to the drawings, FIG. 1 depicts the ball-launching device of the present invention, which is shown and generally illustrated at 10 in the figures. The ball-launching device 10 includes a ball-receiving portion generally indicated at 12 and a handle portion generally indicated at 20. The ball receiving portion 12 includes a structural frame 14, a receiving surface 16 disposed within the structural frame 14 and a ball retaining structure 18 extending outwardly from the structural frame 14. Further, the handle portion 20 generally comprises a tubular body 20 having an elongated tubular sidewall 26 and a storage compartment 22 within said tubular sidewall 26. The ball-launching device 10 is configured to assist in training a dog to retrieve and to encourage the dog to deposit the ball into the ball receiving portion 12 upon retrieval, while also eliminating the need for the user to handle the ball after it has been in the dog's mouth.

The ball-receiving portion 12 as stated above generally is formed using a structural frame 14 about its periphery, wherein the structural frame 14 defines a central opening 24 therein. A ball-receiving surface 16 is suspended within the opening 24 in the structural frame 14 and the ball-receiving surface 16 is anchored to the structural frame member 14. In the preferred embodiment, the ball-receiving surface 16 is stretched taughtly within the structural frame 14 defining the ball-receiving portion 12. It is also anticipated, however, that within the scope of the present invention the ball receiving surface 16 may also be loosely suspended within the structural frame 14 thereby forming a pocket for receiving a ball. Additionally, the ball-receiving surface 16 may be formed integrally with the structural frame 14 in that they may be monolithically molded as a single part.

The ball-receiving surface 16 may be a solid surface, may be perforated, may be a mesh, may be a polymer film or may be a series of interwoven strands similar in construction to a tennis racket. The ball-receiving surface 16 may be formed from any suitable material and is preferably selected from a material such as cloth, mesh, plastic sheeting, plastic fabric and interwoven strands. The purpose of the ball receiving surface 16 is to provide a platform onto which the dog can deposit the ball after retrieval while also creating a platform for launching the ball as will be described in detail below.

In addition the ball receiving portion 12 includes a ball retention structure 18 in the form of a lip that extends outwardly and upwardly from the structural frame 14. The retaining structure 18 is a lip that surrounds the ball receiving portion 12 and assists in preventing the ball from falling off of the ball receiving surface 16 once the dog has deposited the ball, or when the user is preparing to use the launching device 10 to launch the ball. In addition, the ball retaining structure 18 creates a lip that can assist a user should they wish to scoop the ball from the ground if the ball has been dropped. As was stated above, one of the goals of the present invention is to eliminate the need for the user to utilize their hands to pick up, transfer or throw the ball. In this regard, the ball retaining structure 18 both holds the ball on the ball receiving surface 16 and makes picking up the ball from the ground easier and more preferable in that the user avoids direct contact with the ball.

The handle 20 of the ball-launching device 10 extends outwardly from the structural frame 14 and provides a convenient location for the user to grip the ball-launching device 10. In addition, the handle 20 serves as an extension that creates leverage, thereby giving the user a mechanical advantage when launching the ball. This allows the user to launch the ball more frequently and for longer distances with less resultant fatigue. In addition, it reduces or eliminates the need for the user to bend down to retrieve the ball from the dog's mouth or pick the ball up from the ground after the dog has dropped it. In operation, the user can simply hurl the ball using the ball-launching device 10 of the present invention. Additionally, the user could, if desired, toss the ball into the air and strike the ball with the ball-receiving surface 16, much in the same manner as he would employ a tennis racket. Clearly, the toss and strike method is suited for ball receiving surfaces 16 that are taught within the structural frame 14.

Figure 2:
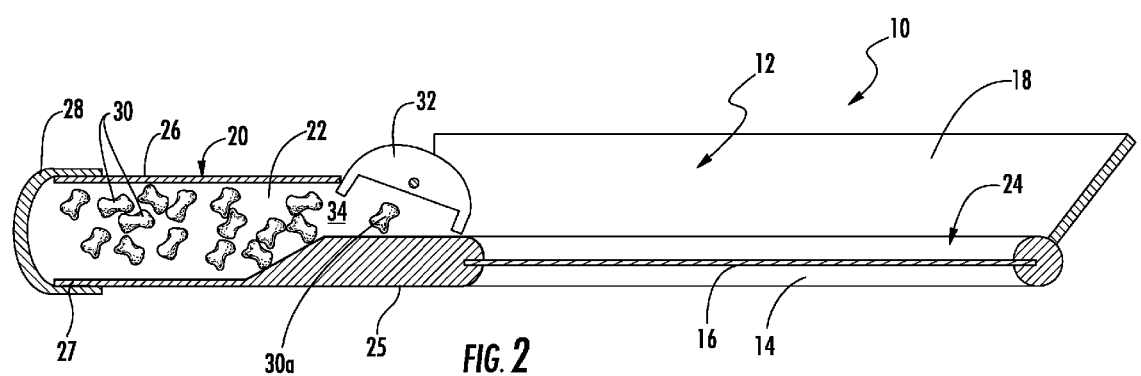
FIG. 2 is a cross sectional view of the ball launching device taken along line 2-2 of FIG. 1 with the dispenser shown in a first position.

Turning to FIG. 2, the handle 20 can be seen also to include an internal storage compartment 22 formed therein. Generally, the handle 20 is formed as a hollow tubular structure with a sidewall 26 extending between a first end 25 attached to the structural frame 14 and a second end 27. This hollow tubular structure creates a convenient storage compartment 22 within the handle 20 for the storage of a plurality of treats 30 for use in training the dog through positive reinforcement. The storage compartment 22 has a cap 28 on the second end 27 thereof, which can be removed to allow the user to replenish the supply of treats 30 within the storage compartment 22. After the compartment 22 is refilled, the cap 28 is replaced to retain the treats 30 therein.

Figure 2A:
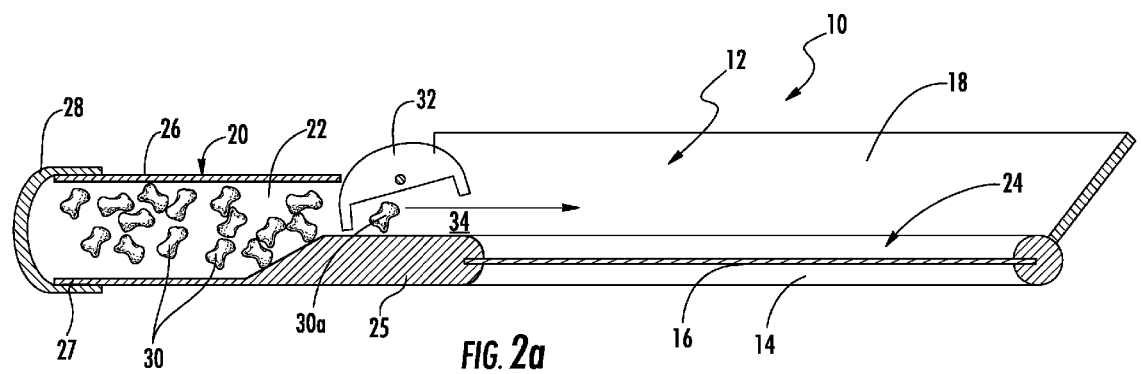
FIG. 2a is a cross sectional view of the ball launching device taken along line 2-2 of FIG. 1 with the dispenser shown in a second, dispensing position.

In addition, it can be seen that the first end 25 of the storage compartment 22 includes a dispenser mechanism 32 positioned adjacent the ball receiving surface 16. The dispenser 32 is selectively operable by the user to dispense treats from the storage compartment 22 onto the ball-receiving surface 16. Preferably, the dispenser mechanism 32 is configured to allow only a single treat 30a to be deposited onto the ball receiving surface 16 with each cyclical operation of the dispenser mechanism 32. Turning to FIG. 2 in combination with FIG. 2a, it can be seen that the dispenser 32 is operable between a first position, shown in FIG. 2, wherein the dispenser aperture 34 is open towards the plurality of treats 30 within the storage compartment 22 thereby allowing a treat 30a to enter the dispenser mechanism 32 and a second position, shown in FIG. 2a, wherein the dispenser aperture 34 is open to the ball receiving surface 16 thereby allowing the treat 30a to pass out onto the ball receiving surface 16. In the preferred embodiment, the dispenser mechanism 32 can be seen to be rotatably mounted into the handle 20, however any other dispenser mechanism 32 known in the art for dispensing a single object at a time would also fall within the scope of the present invention.

Figure 3:
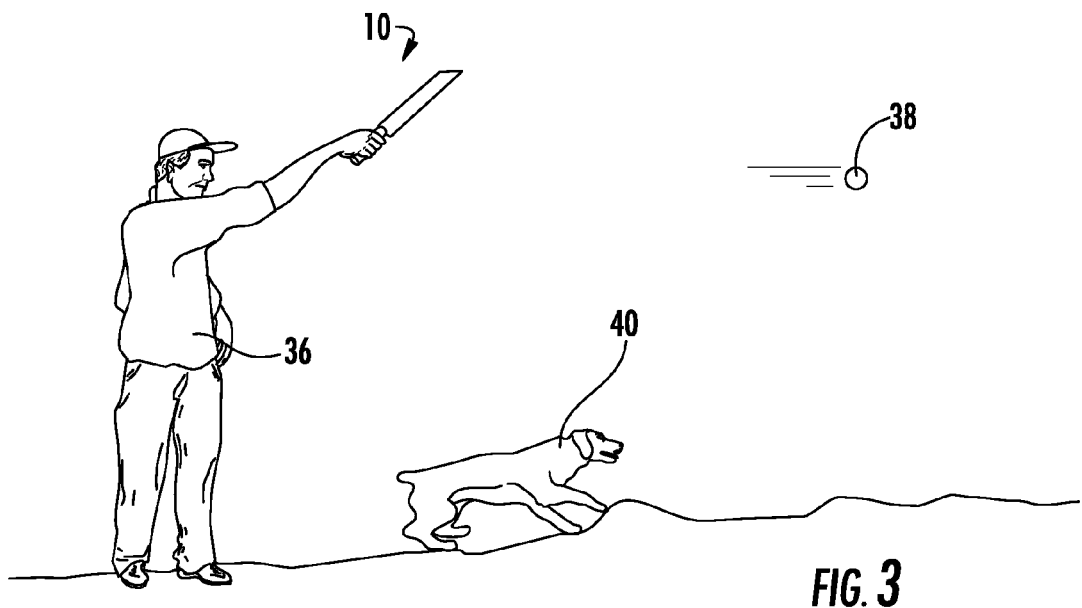
FIG. 3 is a view of the ball launching device in use for launching a ball.
Figure 3A:
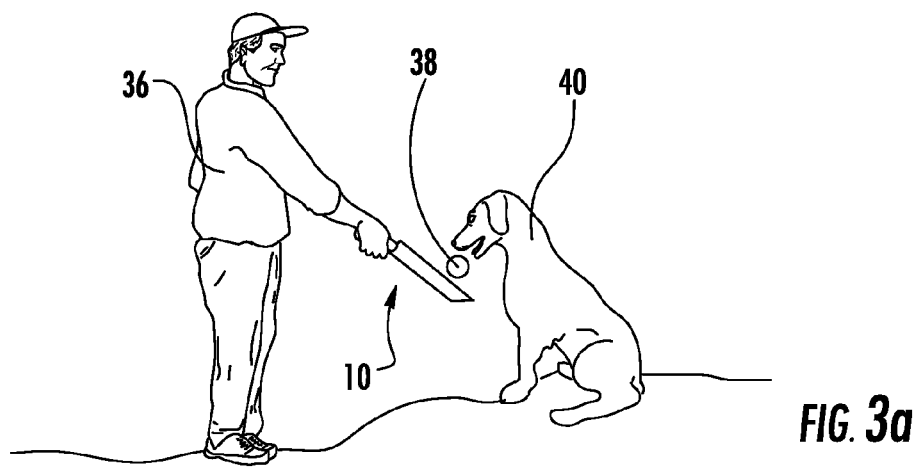
FIG. 3a is a view of the ball-launching device in use with a dog depositing a retrieved ball.

In operation the ball-launching device 10 of the present invention is particularly suited for use in connection with the training of a dog. Turning to FIGS. 3 and 3a, it can be seen that a user 36 utilizes the ball-launching device 10 to launch the ball 38 outwardly for the dog 40 to go and fetch. The user 36 then turns the ball-launching device 10 so that the ball-receiving surface 16 faces upwardly. The user 36 then dispenses a treat 30a as described above onto the ball-receiving surface 16. When the dog 40 returns with the ball 38, the dog 40 must release the ball 38 in order to consume the treat 30a. Accordingly, the dog 40 deposits the ball 38 onto the ball receiving surface 16 in effect, trading the ball 38 for the treat 30a. In this manner, the dog 40 also receives immediate positive reinforcement for the behavior of retrieving the ball 38 and placing it in the desired location on the ball receiving surface 16. Further, the user 36 is spared the need for handling the ball 38 after the dog 40 has coated it with a layer of saliva. The process can be frequently repeated wherein the user 36 again launches the ball 38 for retrieval as the construction of the ball launching device 10 reduces the effort required by the user 36 thereby allowing the game of fetch to continue for extended periods of time before the user 36 tires.

It can therefore be seen that the present invention provides a unique ball-launching device 10 for assisting in training a dog 40 to retrieve an object such as a ball 38. The ball-launching device 10 provides a user 36 with a convenient design that reduces the fatigue associated with repeated launching of the ball 38 while also eliminating the need for physically handling the ball 38. Additionally, the ball-launching device 10 includes a convenient storage compartment 22 integrated into the handle 20 thereof with a dispenser 32 that serves to dispense treats 30 for immediate positive reinforcement to the dog 40 when the ball 38 is retrieved. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A device for launching and receiving a ball, comprising:
   a structural frame including a peripheral edge defining a central opening therein and a handle extending outwardly from said peripheral edge;
   a ball receiving surface stretched tautly within said central opening and anchored to said structural frame, said ball receiving surface being flat and having a size that is sufficient to simultaneously receive both a ball and a treat said flat surface area also configured and arranged to launch said ball;
   a ball retention structure that extends outwardly and upwardly from the structural frame; and
   a treat dispensing mechanism configured and arranged to selectively dispense at least one treat onto the ball receiving structure, wherein a pet deposits said ball onto said ball receiving structure adjacent said dispensed treat thereby leaving said ball on said ball receiving structure in exchange for said treat.

2. The device for launching a ball of claim 1, further comprising:
   an interior compartment within said handle for storing a plurality of said treats, said compartment having a forward end opening onto said ball receiving structure, and
   said treat dispensing mechanism disposed within said opening at said forward end of said interior compartment, said dispenser configured to dispense at least one treat onto said receiving structure from said plurality of treats stored within said interior compartment.

3. The device for launching a ball of claim 2, further comprising:
   a removable cover engaged with an open rearward end of said storage compartment, wherein said plurality of treats can be replenished after removal of said cover.

4. The device for launching a ball of claim 2, wherein said dispenser is configured to dispense only a single treat each time it is operated.

5. The device for launching a ball of claim 2, said dispensing mechanism being rotatably received within said opening and displaceable between a first position wherein a dispenser aperture within said dispensing mechanism is open to said storage compartment and a second position wherein said dispenser aperture is open to said receiving structure, wherein one of said plurality of said treats within said storage compartment enters said dispenser aperture when said dispenser is in said first position and said treat is dispensed onto said receiving structure when said dispenser is in said second position.

6. The device for launching a ball of claim 1, wherein said receiving surface is a material selected from the group consisting of: cloth, mesh, plastic sheeting, plastic fabric and interwoven strands.

7. A method of training a dog to fetch comprising the steps of:
   providing a launching device comprising:
      a structural frame including a peripheral edge defining a central opening therein and a handle extending outwardly from said peripheral edge;
      a ball receiving surface stretched tautly within said central opening and anchored to said structural frame, said ball receiving surface being flat and having a size that is sufficient to simultaneously receive both a ball and a treat said flat surface area also configured and arranged to launch said ball;
      a ball retention structure that extends outwardly and upwardly from the structural frame; and
      a treat dispensing mechanism configured and arranged to selectively dispense at least one treat onto the ball receiving structure;
   launching a ball with said launching device;
   sending said dog to retrieve said ball;
   dispensing a treat from said storage compartment onto said receiving surface;
   holding said launching device in a position thereby allowing said dog to deposit said retrieved ball onto said receiving surface adjacent said dispensed treat thereby leaving said ball on said ball receiving structure in exchange for said dispensed treat, said treat positively reinforcing said dog's behavior of retrieving and depositing said ball.

8. The method of training a dog of claim 7, wherein said dispenser is configured to dispense only a single treat each time it is operated.

* * * * *